United States Patent
Matsumoto et al.

(10) Patent No.: US 6,335,391 B1
(45) Date of Patent: Jan. 1, 2002

(54) COPOLYMER LATEX FOR ADHESIVE FOR RUBBER/METAL ADHESION AND PROCESS FOR PRODUCING SAME

(75) Inventors: Seiji Matsumoto, Tokuyama; Tsuneo Hironaka, Hohu; Shinji Ozoe, Shinnanyo; Tamotsu Sato, Kudamatsu, all of (JP)

(73) Assignee: Tosoh Corporation, Yamaguchi (JP)

( * ) Notice: Subject to any disclaimer, the term of this patent is extended or adjusted under 35 U.S.C. 154(b) by 0 days.

(21) Appl. No.: 09/522,005

(22) Filed: Mar. 9, 2000

(30) Foreign Application Priority Data

Mar. 10, 1999 (JP) .......................... 11-063699

(51) Int. Cl.⁷ .................. C08K 5/17; C08F 114/14; C08F 214/14
(52) U.S. Cl. ............ 524/236; 524/259; 524/552; 524/433; 526/294; 526/295; 526/336
(58) Field of Search .................. 524/236, 259, 524/552, 433; 526/294, 295, 336

(56) References Cited

U.S. PATENT DOCUMENTS

| | | | |
|---|---|---|---|
| 2,581,920 A | * | 1/1952 | Kuhn ........................ 154/130 |
| 2,725,373 A | | 11/1955 | Reynolds |
| 2,900,292 A | | 8/1959 | Coleman, Jr. et al. |
| 3,258,388 A | | 6/1966 | Coleman, Jr. et al. |
| 3,258,389 A | | 6/1966 | Coleman, Jr. et al. |
| 3,402,157 A | | 9/1968 | Moyer, Jr. et al. |
| 3,562,192 A | | 2/1971 | Conard |
| 4,483,962 A | * | 11/1984 | Sadowski ................... 524/552 |
| 5,036,122 A | | 7/1991 | Auerbach et al. |
| 5,200,459 A | | 4/1993 | Weih et al. |
| 5,268,404 A | * | 12/1993 | Mowrey .................... 524/236 |

\* cited by examiner

Primary Examiner—David W. Wu
Assistant Examiner—R. Harlan
(74) Attorney, Agent, or Firm—Nixon & Vanderhye

(57) ABSTRACT

A latex adhesive for rubber/metal adhesion, which contains a copolymer consisting of, based on the weight of the copolymer, (A) 90.0 to 97.0% by weight of 2,3-dichloro-1,3-butadiene units, (B) 1.5 to 5.0% by weight of 1,2-dichloro-1,3-butadiene units, and (C) 1.5 to 5.0% by weight of 1,3-dichloro-1,3-butadiene units. The latex adhesive is prepared by polymerizing a monomer mixture consisting of the stated amounts of the monomers (A), (B) and (C) in the presence of a free-radical initiator, preferably a redox catalyst system, by an emulsion polymerization procedure. The latex adhesive has good mechanical stability and exhibits enhanced adhesion for rubber/metal adhesion.

8 Claims, No Drawings

COPOLYMER LATEX FOR ADHESIVE FOR RUBBER/METAL ADHESION AND PROCESS FOR PRODUCING SAME

BACKGROUND OF THE INVENTION (1) Field of the Invention

This invention relates to a copolymer latex used as a base material for an adhesive for rubber/metal adhesion, and a process for producing the copolymer latex.

(2) Description of the Related Art

An adhesive for a rubber/metal adhesion is widely used for the production of, for example, automobile rubber articles, industrial rubber articles and building rubber articles. A typical example of the adhesive for rubber/metal adhesion includes a polymer or copolymer of 2,3-dichloro-1,3-butadiene (hereinafter abbreviated to "2,3-DCB") as an essential ingredient. 2,3-DCB polymers and copolymers are used in the form of a solution in an organic solvent, and thus, these polymers and copolymers must be soluble in organic solvents. Usually a homopolymer of 2,3-DCB is difficult to dissolve in organic solvents, and therefore, 2,3-DCB homopolymer is brominated, or 2,3-DCB is copolymerized with, for example, α-haloacrylonitrile or α-chlorostyrene, to give a polymer soluble in organic solvents. For example, a process for brominating a 2,3-DCB polymer to impart solubility to the 2,3-DCB polymer is described in U.S. Pat. No. 2,725,373. A process for copolymerizing 2,3-DCB with acrylonitrile or chlorostyrene to give a 2,3-DCB copolymer having solubility in organic solvents is described in U.S. Pat. No. 3,562,192. However, acrylonitrile, α-haloacrylonitrile and chlorostyrene are expensive and toxic, and thus, restricted in handling.

In recent years, the use of organic solvents for adhesives has been restricted in view of cleaning up of the environment and preservation of good working hygiene. There is an increasing demand for developing an organic solvent-free adhesive or an aqueous adhesive. For example, aqueous adhesives for rubber/metal adhesion have been proposed in U.S. Pat. No. 5,036,122, ibid. U.S. Pat. No. 5,200,459 and Japanese Unexamined Patent Publication No. H2-1793.

SUMMARY OF THE INVENTION

In view of the foregoing technical background, an object of the present invention is to provide a latex used as a base material for an adhesive for rubber/metal adhesion, which exhibits an enhanced adhesion of rubber to metal, and which latex is obtained without the use of a toxic and expensive monomer.

In one aspect of the present invention, there is provided a copolymer latex used for an adhesive for rubber/metal adhesion, which comprises a copolymer consisting of, based on the weight of the copolymer, (A) 90.0 to 97.0% by weight of 2,3-dichloro-1,3-butadiene units, (B) 1.5 to 5.0% by weight of 1,2-dichloro-1,3-butadiene units, and (C) 1.5 to 5.0% by weight of 1,3-dichloro-1,3-butadiene units.

In another aspect of the present invention, there is provided a process for producing a copolymer latex used for an adhesive for rubber/metal adhesion, which comprises polymerizing a monomer mixture consisting of, based on the weight of the monomer mixture, (A) 90.0 to 97.0% by weight of 2,3-dichloro-1,3-butadiene, (B) 1.5 to 5.0% by weight of 1,2-dichloro-1,3-butadiene, and (C) 1.5 to 5.0% by weight of 1,3-dichloro-1,3-butadiene, in the presence of a free-radical initiator by an emulsion polymerization procedure.

DESCRIPTION OF THE PREFERRED EMBODIMENTS

The copolymer constituting the latex of the invention comprises, based on the weight of the copolymer, (A) 90.0 to 97.0% by weight of 2,3-dichloro-1,3-butadiene units, (B) 1.5 to 5.0% by weight of 1,2-dichloro-1,3-butadiene units, and (C) 1.5 to 5.0% by weight of 1,3-dichloro-1,3-butadiene units. If the amount of the monomer units (A) is smaller than 90% by weight, the copolymer has poor strength and the adhesive has a reduced adhesion strength. In contrast, if the amount of the monomer units (A) is in excess of 97% by weight, the adhesive also has a reduced adhesion strength although the reason therefor is not clear. If the amount of each of the monomer units (B) and (C) is smaller than 1.5% by weight, or, in excess of 5.0% by weight, the adhesive has a reduced adhesion strength although the reason therefor is not clear.

The copolymer latex of the invention is prepared by polymerizing a monomer mixture comprising the three monomer ingredients (A), (B) and (C) by an emulsion polymerization procedure. The emulsion polymerization may be conducted by an ordinary procedure wherein water, monomers, an emulsifying agent, a free-radical initiator and a chain transfer agent are mixed together to prepare an aqueous emulsion, and the emulsion is subjected to polymerization at a predetermined temperature. The monomers may be incorporated collectively, sequentially or in lots. It is to be noted, however, that 2,3-DCB has an extremely high polymerizability, and thus, the rate of polymerization should be controlled so that the polymerization is safely conducted. Therefore, the monomers are preferably incorporated sequentially or in lots. The incorporation of monomers in lots is more preferable because undesirable scaling can be minimized.

The emulsifying agent used is not particularly limited, and includes carboxylic acid type, sulfonic acid type and sulfuric acid ester type anionic emulsifying agents and nonionic emulsifying agents. As specific examples of the emulsifying agent, there can be mentioned alkali metal salts, ammonium salts and amine salts of disproportionated rosin acid; alkali metal salts, ammonium salts and amine salts of alkylsulfonic acid; alkali metal salts, ammonium salts and amine salts of alkylsulfuric acid ester; alkali metal salts, ammonium salts and amine salts of alkylarylsulfonic acid; alkali metal salts, ammonium salts and amine salts of alkylarylsulfuric acid ester; alkali metal salts, ammonium salts and amine salts of polyoxyethylene alkylphenyl ether sulfuric acid ester; alkali metal salts, ammonium salts and amine salts of polyoxyethylene alkyl ether sulfuric acid ester; a condensate of sodium napthalenesulfonate with formaldehyde, polyoxyethylene alkyl ether, polyoxyethylene alkyl phenol, sorbitan fatty acid ester, polyoxyethylene acyl ester, polyvinyl alcohol, and alkali metals salts and amines salts of alkyldiphenyl ether disulfonic acid. The amount of the emulsifier is preferably in the range of 0.5 to 10 parts by weight based on 100 parts by weight of the total monomers in view of polymerization stability and adhesion of the adhesive.

The free-radical initiator used can be chosen from known free-radical initiators, which include, for example, persulfates such as potassium persulfate and ammonium persulfate, and organic and inorganic peroxides such as hydrogen peroxide and t-butyl hydroperoxide. These free-radical initiators may be used either alone or as a redox initiator which is a combination of the free-radical initiator with a reducing substance. A redox initiator is preferable because the reaction can be carried out at a low temperature. As the reducing substance, the use of ascorbic acid alone is preferable in view of control of the polymerization. That is, 2,3-DCB has an extremely high polymerizability and the runaway of polymerization can be desirably controlled by using ascorbic acid.

The amount of the free-radical initiator is usually in the range of 0.001 to 2 parts by weight, preferably 0.01 to 0.5 parts by weight, based on 100 parts by weight of the total monomers. The amount of the reducing substance used in combination with the free-radical initiator is in the range of 0.001 to 2parts by weight, preferably 0.01 to 0.5 parts by weight, based on 100 parts by weight of the total monomers.

The polymerization is effected usually at a temperature of 0 to 80° C., preferably 10 to 50° C.

A chain transfer agent is used as a molecular weight modifier. As specific examples of the chain transfer agent, there can be mentioned alkylmercaptans, halogenated hydrocarbons, dialkylxanthogen disulfides, tetraalkylthiuram disulfides, an α-methylstyrene dimer, 1,1-diphenylethylene and sulfur. The amount of the chain transfer agent is preferably in the range of 0.01 to 3% by weight based on the weight of the total monomers.

The termination time of polymerization is not particularly limited, but, the polymerization is preferably carried out until a conversion of 60 to 100%, more preferably 95 to 100%, is reached. When unreacted monomers remain, the unreacted monomers can be removed by, for example, stripping.

As a short-stopper, conventional short-stoppers can be used which include, for example, hindered phenol compounds such as 2,6-t-butyl-4-methylphenol, and phenothiazine and diethylhydroxylamine. The short-stoppers are added as a solution in an organic solvent and/or in 2,3-DCB monomer, or as an aqueous emulsion, when the predetermined conversion is reached.

The content of copolymer in the latex of the invention is usually in the range of 10 to 60% by weight, preferably 20 to 50% by weight, based on the total weight of the copolymer latex.

The copolymer latex of the invention can be used as an adhesive either as it is or as a mixture thereof with an adhesion-enhancing aid. A most preferable adhesion-enhancing aid is an aromatic polynitroso compound having at least two nitroso groups which are not adjacent to each other and are located on the ring of an aromatic hydrocarbon. As specific examples of the aromatic polynitroso compound, there can be mentioned m-dinitrosobenzene, p-dinitrosobenzene, 2-methyl-1,4-dinitrosobenzene, 2-methyl-5-chloro-1,4-dinitrosobenzene, 2-fluoro-1,4-dinitrosobenzene, 2-methoxy-1,3-dinitrosobenzene, 5-chloro-1,3-dinitrosobenzene, 2-benzyl-1,4-dinitrosobenzene, 2-cyclohexyl-1,4-dinitrosobenzene, p-dinitrosonapthalene and m-dinitrosonapthalene. As other adhesion-enhancing aids, there can be mentioned halogen-containing polymers such as chlorinated natural rubber, chlorinated butadiene rubber, chloroprene rubber, chlorosulfonated polyethylene, chlorinated polyolefin and chlorinated polyvinyl chloride; phenol-formaldehyde resin, amino resin, petroleum resin, rosin resin, and rosin ester resin. Other ingredients such as a pigment, a filler and a plasticizer may be incorporated in an adhesive containing the copolymer latex.

The amount of the adhesion-enhancing aid is usually in the range of 5 to 100 parts by weight, preferably 10 to 50 parts by weight, based on 100 parts by weight of the copolymer.

The rubber and metal to be adhered by the copolymer latex adhesive of the invention are not particularly limited. The rubber includes, for example, natural rubber, styrene-butadiene rubber, acrylonitrile-butadiene rubber, butadiene rubber, isoprene rubber, butyl rubber, chloroprene rubber, chlorosulfonated polyethylene, chlorinated polyethylene, acrylic rubber, urethane rubber, hydrogenated acrylonitrile-butadiene rubber, epichlorohydrin rubber, silicone rubber, fluororubber, ethylene-propylene rubber and thermoplastic elastomers. The metal includes, for example, iron, aluminum, copper and stainless steel.

The adhesion of rubber with a metal can be carried out in a conventional manner. For example, a metal surface is polished with an abrasive such as an abrasive-grain coated abrasive, and the polished surface is coated with an adhesive, and then, the coated surface is dried. The drying procedure is not particularly limited, and, for example, air drying at normal temperature or heat-drying can be adopted. Unvulcanized rubber compound is placed in contact with the adhesive-coated surface of metal, and is heated at a temperature of 140 to 200° C. for 3 to 40 minutes while being pressed by a press. The heating conditions may be appropriately varied depending upon the rate of vulcanization and thickness of rubber.

The invention will now be described specifically by the following examples that by no means limit the scope of the invention.

Mechanical stability (aggregation percentage) of a copolymer latex for adhesive for rubber/metal adhesion, and adhesion property (peel strength and peeled state) of an adherend rubber/metal article were evaluated as follows.

(1) Mechanical Stability (Aggregation Percentage)

Mechanical stability of an adhesive composition comprising a 2,3-DCB copolymer latex was evaluated as rubber aggregation % as measured by the Maron method according to JIS K-6387 (1997).

(2) Peel Strength and Peeled State

Each of three iron sheets having a size of 25 mm×70 mm ×3 mm was surface-polished by an abrasive grain-coated abrasive. Each polished surface was coated with Chemlok 205 as a primer, and the coating was dried at normal temperature for 30 minutes. The dried coated surface of iron sheet was then coated with an adhesive composition comprising 100 parts by weight of a 2,3-DCB copolymer latex and 10 parts by weight of p-dinitrosobenzene, and the coating was dried at normal temperature for 30 minutes. The three iron sheets were laid in parallel on a metal frame having a size of 70 mm×75 mm. A sheet-form unvulcanized rubber compound prepared according to the recipe shown in Table 1 was placed as an adherend on the iron sheets, and then subjected to press vulcanization at a temperature of 160° C. for 30 minutes. The vulcanized rubber sheets were allowed to stand to be thereby cooled to normal temperature, and each vulcanized rubber sheet was cut to the same size as that of each iron sheet to prepare a testing specimen. 90 degree peel strength of the specimen was measured at a drawing rate of 50 mm/min at a temperature of 23° C. evaluated by using a Tensilon tensile tester. Further, a state of the interfacial boundary between the peeled adherend rubber and the metal was observed to evaluate adhesion of the adhesive.

TABLE 1

Composition of Adherend Rubber Compound

| Ingredients | Chloroprene rubber compound (CR) | Natural rubber compound (NR) |
|---|---|---|
| Skyprene B-30 *1 | 100 | — |
| Natural rubber (RSS#3) | — | 100 |
| Magnesium oxide | 4 | — |
| Stearic acid | 0.5 | 2 |
| Antage 3C *2 | 1 | 1 |
| Nocrac AD *3 | 2 | 2 |
| FT carbon | 35 | 35 |
| FEF carbon | 25 | 25 |
| Active zinc oxide | 5 | 5 |
| Sanceler 22C *4 | 0.7 | — |
| Nocceler *5 | 0.5 | 1 |
| Sulfur | — | 3 |

Note:
*1 Chloroprene rubber (supplied by Tosoh Corp.)
*2 N-isopropyl-N'-phenyl-p-phenylenediamine (supplied by Kawaguchi Chem. Ind. Co.)
*3 Octylated diphenylamine (supplied by Ohuchi Shinko Chem. Ind. Co.)
*4 Ethylene thiourea (supplied by Sanshin Chem. Ind. Co.)
*5 Dibenzothiazyl disulfide (supplied by Ouchi Shinko Chem. Ind. Co.)

EXAMPLE 1

A copolymer was prepared from a monomer mixture having the composition shown in Table 2, which was a mixture of 2, 3-DCB with 1,2-dichloro-1,3-butadiene and 1,3-dichloro-1,3-butadiene, produced as by-products at the production of 2,3-DCB. That is, a 10 liter autoclave equipped with a stirrer was charged with 1,200 g of the monomer mixture, 4 g of n-dodecylmercaptan, 250 g of disproportionated potassium rosinate, 20 g of a condensate of sodium naphthalenesulfonate with formaldehyde, 20 g of sodium sulfate oleate, 15 g of sodium hydroxide and 5,935 g of deionized water, and the content was stirred at 20° C. for 30 minutes in a nitrogen atmosphere. Then 0.56 g of ascorbic acid was added, and further an aqueous potassium persulfate solution containing 0.370 g of potassium persulfate and 0.100 g of sodium anthraquinonesulfonate, dissolved in 400 g of deionized water, was continuously added to initiate polymerization. When the conversion reached 80.3%, the addition of the aqueous potassium persulfate solution was stopped, and the polymerization mixture was aged for 1 hour as it was.

Then 1,200 g of a monomer mixture having the same composition as that initially charged in the autoclave was added and the polymerization mixture was stirred for 30 minutes. Then 0.56 g of ascorbic acid was added, and further an aqueous potassium persulfate solution containing 0.370 g of potassium persulfate and 0.100 g of sodium anthraquinonesulfonate, dissolved in 400 g of deionized water, was continuously added to again initiate polymerization. When the total conversion reached 85.7% (the conversion was determined as mentioned below), the addition of the aqueous potassium persulfate solution was stopped, and the polymerization mixture was aged for 1 hour as it was. The determination of conversion was conducted by measuring the solid content in the polymerization mixture. That is, about 2 g of a sample latex was weighed and the sample was dried at 170° C. for 20 minutes. The conversion was calculated from the weight of the dried content. This procedure for determining the conversion was applied in the succeeding examples and comparative examples.

After the aging, 1,200 g of a monomer mixture having the same composition as that initially charged in the autoclave was again added and the polymerization mixture was stirred for 30 minutes. Then 0.56 g of ascorbic acid was added, and further an aqueous potassium persulfate solution containing 0.370 g of potassium persulfate and 0.100 g of sodium anthraquinonesulfonate, dissolved in 400 g of deionized water, was continuously added to again initiate polymerization. When the total conversion reached 99.4%, the addition of the aqueous potassium persulfate solution was stopped, and then 0.4 g of phenothiazine and 0.4 g of t-butylcatechol were added to obtain a copolymer latex adhesive for rubber/metal adhesion having a solid content of 39.3%.

Mechanical stability (aggregation %) and adhesion property (peel strength and peeled state) of the copolymer latex adhesive were evaluated. The chloroprene rubber compound shown in Table 1 was used as a rubber adherend for the evaluation of the adhesion property. The evaluation results are shown in Table 2.

TABLE 2

| Monomer composition | Examples | | | | |
|---|---|---|---|---|---|
| charged (weight %) | Ex. 1 | Ex. 2 | Ex. 3 | Ex. 4 | Ex. 5 |
| 2,3-dichloro-1,3-butadiene | 95 | 96 | 97 | 90 | 95 |
| 1,2-dichloro-1,3-butadiene *1 | 2.5 | 2.0 | 1.5 | 5 | 2.5 |
| 1,3-dichloro-1,3-butadiene *1 | 2.5 | 2.0 | 1.5 | 5 | 2.5 |
| α-bromoacrylonitrile | — | — | — | — | — |
| Acrylic acid | — | — | — | — | — |
| Rubber aggregation % | 0.004 | 0.001 | 0.003 | 0.003 | 0.004 |
| Adherend rubber compound | CR | CR | CR | CR | NR |
| Peel strength (N/25 mm) | 360 | 350 | 360 | 350 | 340 |
| Peeled state *2 | R.F. | R.F. | R.F. | R.F. | R.F. |

Note:
*1 By-products produced in the production of 2,3-DCB
*2 R.F. = Rubber failure occurred when the adherend rubber was peeled from metal

EXAMPLE 2

By the same procedures described in Example 1, a copolymer latex adhesive for rubber/metal adhesion having a solid content of 39.1% by weight was prepared wherein 250 g of pellex SSH (supplied by Kao Corp.) was used instead of 15 g of sodium hydroxide, 250 g of disproportionated potassium rosinate and 20 g of sodium sulfate salt of oleic acid, and a monomer mixture having the composition shown as Example 2 in Table 2 was used with all other conditions remaining the same.

Mechanical stability (aggregation %) and adhesion property (peel strength and peeled state) of the copolymer latex adhesive were evaluated. The chloroprene rubber compound shown in Table 1 was used as a rubber adherend for the evaluation of the adhesion property. The evaluation results are shown in Table 2.

EXAMPLE 3

By the same procedures described in Example 1, a copolymer latex adhesive for rubber/metal adhesion having a solid content of 39.4% by weight was prepared wherein a monomer mixture having the composition shown as Example 3 in Table 2 was used with all other conditions remaining the same.

Mechanical stability (aggregation %) and adhesion property (peel strength and peeled state) of the copolymer latex adhesive were evaluated. The chloroprene rubber compound shown in Table 1 was used as a rubber adherend for the evaluation of the adhesion property. The evaluation results are shown in Table 2.

EXAMPLE 4

By the same procedures described in Example 1, a copolymer latex adhesive for rubber/metal adhesion having a solid content of 39.5% by weight was prepared wherein a monomer mixture having the composition shown as Example 4 in Table 2 was used with all other conditions remaining the same.

Mechanical stability (aggregation %) and adhesion property (peel strength and peeled state) of the copolymer latex adhesive were evaluated. The chloroprene rubber compound shown in Table 1 was used as a rubber adherend for the evaluation of the adhesion property. The evaluation results are shown in Table 2.

EXAMPLE 5

By using the same copolymer latex adhesive as that prepared in Example 1, adhesion property (peel strength and peeled state) of the copolymer latex adhesive were evaluated. The natural rubber compound shown in Table 1 was used as a rubber adherend for the evaluation of the adhesion property. The evaluation results are shown in Table 2.

Comparative Example 1

By the same procedures described in Example 1, a copolymer latex adhesive for rubber/metal adhesion having a solid content of 39.5% by weight was prepared wherein a monomer mixture having the composition shown as Comparative Example 1 in Table 3 was used with all other conditions remaining the same.

Mechanical stability (aggregation %) and adhesion property (peel strength and peeled state) of the copolymer latex adhesive were evaluated. The chloroprene rubber compound shown in Table 1 was used as a rubber adherend for the evaluation of the adhesion property. The evaluation results are shown in Table 3.

TABLE 3

| Monomer composition | Comparative Examples | | | | |
| --- | --- | --- | --- | --- | --- |
| (weight %) | C. Ex. 1 | C. Ex. 2 | C. Ex. 3 | C. Ex. 4 | C. Ex. 5 |
| 2,3-dichloro-1,3-butadiene | 99 | 84 | 99 | 90 | 90 |
| 1,2-dichloro-1,3-butadiene *1 | 0.5 | 8.0 | 0.5 | — | — |
| 1,3-dichloro-1,3-butadiene *1 | 0.5 | 8.0 | 0.5 | — | — |
| α-bromoacrylonitrile | — | — | — | 10 | 8 |
| Acrylic acid | — | — | — | — | 2 |
| Rubber aggregation % | 0.004 | 0.004 | 0.004 | 0.25 | 0.51 |
| Adherend rubber compound | CR | CR | NR | CR | CR |
| Peel strength (N/25 mm) | 230 | 190 | 200 | 250 | 280 |
| Peeled state *2 | P.I.B. | P.I.B. | P.I.B. | P.I.B. & R.F. | P.I.B. & R.F. |

Note:
*1 By-products produced in the production of 2,3-DCB
*2 P.I.B. = Peeling occurred at the interfacial boundary of iron sheet
P.I.B. & R.F. = Peeling partly occurred at the interfacial boundary of iron sheet, and rubber failure partly occurred.

Comparative Example 2

By the same procedures described in Example 1, a copolymer latex adhesive for rubber/metal adhesion having a solid content of 39.6% by weight was prepared wherein a monomer mixture having the composition shown as Comparative Example 2 in Table 3 was used with all other conditions remaining the same.

Mechanical stability (aggregation %) and adhesion property (peel strength and peeled state) of the copolymer latex adhesive were evaluated. The chloroprene rubber compound shown in Table 1 was used as a rubber adherend for the evaluation of the adhesion property. The evaluation results are shown in Table 3.

Comparative Example 3

By using the same copolymer latex adhesive as that prepared in Comparative Example 1, adhesion property (peel strength and peeled state) of the copolymer latex adhesive were evaluated. The natural rubber compound shown in Table 1 was used as a rubber adherend for the evaluation of the adhesion property. The evaluation results are shown in Table 3.

Comparative Example 4

By the same procedures described in Example 1, a copolymer latex adhesive for rubber/metal adhesion having a solid content of 39.4% by weight was prepared wherein a monomer mixture having the composition shown as Comparative Example 4 in Table 3 was used with all other conditions remaining the same.

Mechanical stability (aggregation %) and adhesion property (peel strength and peeled state) of the copolymer latex adhesive were evaluated. The chloroprene rubber compound shown in Table 1 was used as a rubber adherend for the evaluation of the adhesion property. The evaluation results are shown in Table 3.

Comparative Example 5

By the same procedures described in Example 1, a copolymer latex adhesive for rubber/metal adhesion having a solid content of 39.0% by weight was prepared wherein a monomer mixture having the composition shown as Comparative Example 5 in Table 3 was used with all other conditions remaining the same. When polymerization was terminated, an aggregated mass of rubber aggregated from a latex was observed in the autoclave.

Mechanical stability (aggregation %) and adhesion property (peel strength and peeled state) of the copolymer latex adhesive were evaluated. The chloroprene rubber compound shown in Table 1 was used as a rubber adherend for the evaluation of the adhesion property. The evaluation results are shown in Table 3.

As seen from the comparison of Examples 1 to 5 with Comparative Examples 1 to 5, the copolymer latex adhesives of the invention are clearly superior in rubber mechanical stability (aggregation %) and adhesion property (peel strength and peeled state) to comparative copolymer latex adhesives, although the reason therefor is not clear. More specifically, when the monomer mixture used contains larger than 97.0% by weight of 2,3-DCB and smaller than 1.5% by weight of each of 1,2-dichloro-1,3-butadiene and 1,3-dichloro-1,3-butadiene, or when smaller than 90.0% by weight of 2,3-DCB and larger than 5.0% by weight of each of 1,2-dichloro-1,3-butadiene and 1,3-dichloro-1,3-butadiene, the adhesion property (peel strength and peeled state) is very poor (Comparative Examples 1 to 3). When the monomer mixture used contains 2,3-DCB, but does not contain 1,2-dichloro-1,3-butadiene nor 1,3-dichloro-1,3- butadiene, the mechanical stability (rubber aggregation) and the adhesion property (peel strength and peeled state) are poor (Comparative Examples 4 and 5).

What is claimed is:

1. A copolymer latex used for an adhesive for rubber/metal adhesion, which comprises a copolymer consisting of, based on the weight of the copolymer:
   (A) 90.0 to 97.0% by weight of 2,3-dichloro-1,3-butadiene units,
   (B) 1.5 to 5.0% by weight of 1,2-dichloro-1,3-butadiene units, and
   (C) 1.5 to 5.0% by weight of 1,3-dichloro-1,3-butadiene units.

2. A copolymer latex according to claim 1, which further comprises 5 to 100 parts by weight, based on 100 parts by weight of the copolymer in the latex, of an adhesion-enhancing aid.

3. A copolymer latex according to claim 2, wherein the adhesion-enhancing aid is an aromatic polynitroso compound having at least two nitroso groups which are not adjacent to each other and are located on the ring of an aromatic hydrocarbon.

4. A process for producing a copolymer latex used for an adhesive for rubber/metal adhesion, which comprises polymerizing a monomer mixture consisting of, based on the weight of the monomer mixture:
   (A) 90.0 to 97.0% by weight of 2,3-dichloro-1,3-butadiene,
   (B) 1.5 to 5.0% by weight of 1,2-dichloro-1,3-butadiene, and
   (C) 1.5 to 5.0% by weight of 1,3-dichloro-1,3-butadiene,
   in the presence of a free-radical initiator by an emulsion polymerization procedure.

5. A process for producing a copolymer latex according to claim 4, wherein the free-radical initiator is a redox initiator.

6. A process for producing a copolymer latex according to claim 5, wherein the redox initiator is a combination of a free-radical initiator selected from the group consisting of persulfates and peroxides, with a reducing substance.

7. A process for producing a copolymer latex according to claim 6, wherein the reducing substance is ascorbic acid.

8. A process for producing a copolymer latex according to claim 4, wherein the monomer mixture is in the form of an emulsion prepared by using 0.5 to 10 parts by weight, based on 100 parts by weight of the total monomers, of an emulsifier selected from the group consisting of anionic emulsifiers and nonionic emulsifiers.

* * * * *